United States Patent [19]

Okawa et al.

[11] Patent Number: 4,596,536
[45] Date of Patent: Jun. 24, 1986

[54] CONTINUOUSLY VARIABLE BELT TRANSMISSION DEVICE WITH PULLEYS AXIALLY OFFSET IN THE UNITY TRANSMISSION RATIO POSITION

[75] Inventors: Susumu Okawa; Yuudai Tatara, both of Toyota, Japan

[73] Assignee: Toyota Jidosha Kabushiki Kaisha, Toyota, Japan

[21] Appl. No.: 647,884

[22] Filed: Sep. 6, 1984

[30] Foreign Application Priority Data

Sep. 19, 1983 [JP] Japan ................. 58-173794

[51] Int. Cl.[4] ................. F16H 55/56; F16H 11/02
[52] U.S. Cl. ................. 474/8; 474/28
[58] Field of Search ............ 474/29, 30, 83, 8, 28

[56] References Cited

U.S. PATENT DOCUMENTS

| | | | |
|---|---|---|---|
| 2,893,254 | 7/1959 | Grover | 474/29 X |
| 3,081,642 | 3/1963 | Emerson | 474/28 |
| 3,618,413 | 11/1971 | Cherpes | 474/29 X |
| 3,837,234 | 9/1974 | Chao | 474/29 |
| 4,457,742 | 7/1984 | Hattori | 474/201 |

*Primary Examiner*—Stuart S. Levy
*Assistant Examiner*—Katherine Matecki
*Attorney, Agent, or Firm*—Oblon, Fisher, Spivak, McClelland & Maier

[57] ABSTRACT

A continuously variable belt transmission device, including driving and driven pulley assemblies on parallel axes. Each pulley assembly includes an axially fixed and an axially movable pulley member with confronting conical face which define a V-shaped groove between them whose width is variable according to axial movement of the movable pulley member wherein the axial orders of the fixed and movable pulley members are opposite in the two pulley assemblies. An endless belt assembly is fitted in a power transmitting manner in the V-shaped grooves of the driving and driven pulley assemblies, and thus by alteration of the widths of the grooves the power transmission ratio can be varied. When the widths of the two V-shaped grooves of the two pulley assemblies are substantially equal, with the endless belt assembly being substantially taut between the pulley assemblies, the axial center of the V-shaped driving pulley groove of the driving pulley assembly is, relative to the axial center of the V-shaped driven pulley groove of the driven pulley assemblies, offset towards the axially movable driven pulley member along the axial direction. The maximum amount of skewing of the endless belt assembly is thereby reduced.

3 Claims, 1 Drawing Figure

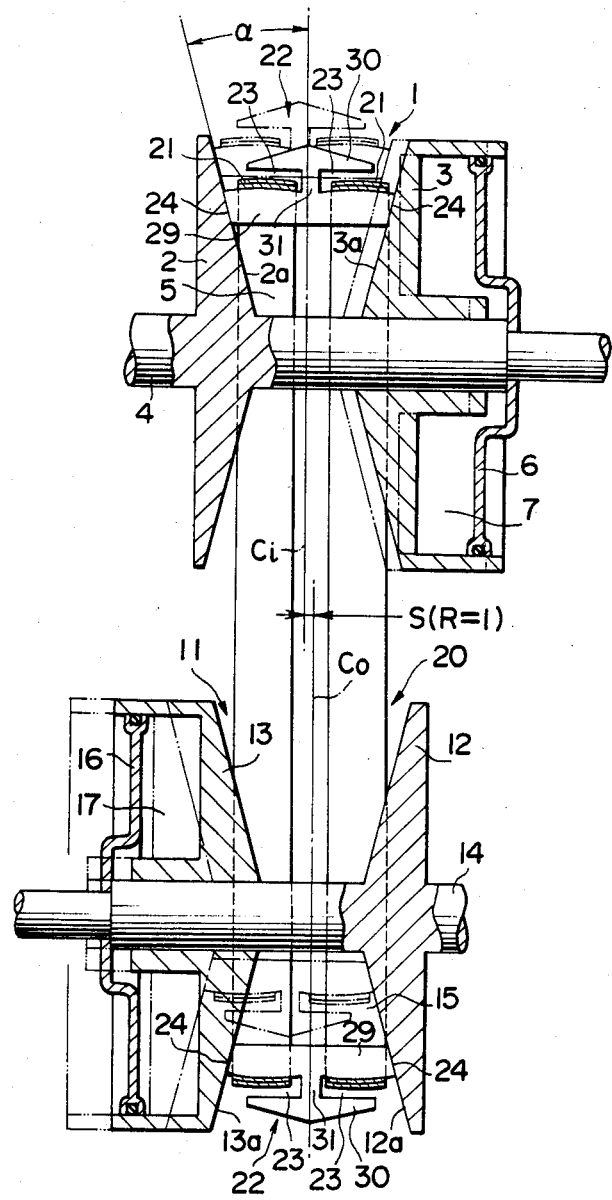

CONTINUOUSLY VARIABLE BELT TRANSMISSION DEVICE WITH PULLEYS AXIALLY OFFSET IN THE UNITY TRANSMISSION RATIO POSITION

BACKGROUND OF THE INVENTION

1. Field of the Invention

The present invention relates to a continuously variable belt transmission device which is suitable for use for coupling the power output member of an engine of a vehicle such as an automobile to the driven wheels thereof, and more particularly relates to such a continuously variable belt transmission device in which an endless transmission belt is stretched around a driving pulley assembly and a driven pulley assembly and in which continuous variation of the transmission ratio is obtained by varying the groove widths of the driving pulley assembly and the driven pulley assembly in synchronization so as to vary the effective diameters of said pulley assemblies.

2. Discussion of the Background

There is a known form of continuously variable belt transmission device, which is generally structured as follows. A driving power input shaft and a driven power output shaft extend parallel to one another, with a driving pulley assembly provided on the driving shaft and a driven pulley assembly provided on the driven shaft. Each of these pulley assemblies is made up of an axially fixed pulley member and an axially movable pulley member, these two pulley members having conical faces which axially confront one another and being spaced apart by a distance which can be varied. Thus, in each of the driving and driven pulley assemblies, a V-shaped groove is defined between the two pulley members thereof, and the width of this V-shaped groove can be selectively altered. An endless belt is fitted around the two pulley assemblies, resting in their V-shaped grooves, and typically this endless belt is made up from a number of wedge shaped blocks each of which fits snugly into the V-shaped grooves, all linked together in series in an chain gang manner by one or more flexible and strong backing belts. With respect to the direction along the axes of the driving and driven shafts, in the driving pulley assembly the axial order of the axially fixed pulley member and the axially movable pulley member is opposite that in the driven pulley assembly. Such a continuously variable belt transmission device is exemplified in the Transmatic transmission of Van Doorn Ness Transmission Company of Holland.

In such a continuously variable belt transmission device, when it is desired to vary the transmission ratio, the widths of the V-shaped grooves of the driving pulley assembly and of the driven pulley assembly are simultaneously altered by a control system, so one of them is narrowed while the other is widened, so that the endless belt rides upwards away from the rotational axis of the one of the pulley assemblies while riding downwards towards the rotational axis of the other of the pulley assemblies, while always keeping the endless belt properly taut. In more detail, considering the unity one-to-one transmission ratio position, in which the endless belt is taut and the radius of its run which is extended around the driving pulley assembly is the same as the radius of its run which is extended around the driven pulley assembly, as the standard unity transmission ratio position (this term will henceforward be used for this state of the transmission), when it is desired to lower the transmission ratio from unity, in other words to provide a speed increasing power transmission function, the movable pulley member of the driving pulley assembly is brought closer to the fixed pulley member of said driving pulley assembly, so that the radius of the run of the endless belt which is extended around said driving pulley assembly increases, while at the same time the movable pulley member of the driven pulley assembly is moved further away from the fixed pulley member of said driven pulley assembly, so that the radius of the run of the endless belt which is extended around said driven pulley assembly decreases. This is done while keeping the endless belt properly taut around the pulley assemblies, by proper synchronization. On the other hand, when it is desired to raise the transmission ratio from unity, in other words to provide a speed reducing power transmission function, the movable pulley member of the driving pulley assembly is brought further away from the fixed pulley member of said driving pulley assembly, so that the radius of the run of the endless belt which is extended around said driving pulley assembly decreases, while at the same time the movable pulley member of the driven pulley assembly is brought closer to the fixed pulley member of said driven pulley assembly, so that the radius of the run of the endless belt which is extended around said driven pulley assembly increases. Again, by proper synchronization, this is done while keeping the endless belt properly taut around the pulley assemblies.

This type of continuously variable belt transmission device is effective for providing good and smooth power transmission with the transmission ratio being continuously variable without interrupting the transmission of power, in a smooth manner. However, it is a fact that, as the V-shaped groove of either of the driving or driven pulley assemblies is altered in width, not only does the radius of the run of the endless belt which is extended around said pulley assembly alter as the belt rides up or down between the pulley members thereof away from or towards the central axis thereof, but also, undesirably but inevitably, the center of the V-shaped groove of the pulley assembly is axially shifted by a distance equal to half the travel of the movable pulley member thereof; and this causes the run of the endless belt around said pulley assembly to be axially shifted in accordance therewith by the same amount. This is the reason that, as specified above, with respect to the direction along the axes of the driving and driven shafts, in the driving pulley assembly the axial order of the axially fixed pulley member and the axially movable pulley member is arranged to be opposite to that in the driven pulley assembly. This particular arrangement means that as the transmission ratio is either increased or decreased from unity the center of the V-shaped groove of the driving pulley assembly is shifted in the same direction as the center of the V-shaped groove of the driven pulley assembly along the axes of the respective shafts, and therefore to a first approximation these motions cancel one another and do not axially twist the endless belt.

In accordance with this, it has been conventional to arrange the length of the endless belt and to configure the continuously variable belt transmission device as a whole so that, when the V-shaped grooves of the driving and driven pulley assemblies are both set to the same width and accordingly the radiuses of the runs of the endless belt which are extended around said pulley assemblies are substantially the same and therefore a power transmission ratio of unity is being provided (the standard unity transmission ratio position), the centers of said V-shaped grooves are coincident in the axial direction of the driving and driven shafts, so that the planes of symmetry of the driving and driven pulley assemblies are coincident. Thus, in this standard unity transmission ratio position, no skewing is caused to the endless belt, and good and smooth transmission is provided. And, when the transmission ratio is altered from this unity position, either upwards or downwards, by widening one of the V-shaped grooves of one of the pulley assemblies and simultaneously narrowing the other, as explained above to a first approximation the centers of the V-shaped grooves are moved to the same amount in the same direction, thus not causing any skewing.

However, the problem with this construction is that the magnitude of the movement of the center of the V-shaped grooves is in fact only the same to a first approximation. Considering a small alteration in transmission ratio from a position of the continuously variable belt transmission device which is not the unity transmission ratio position so that the radiuses of the runs of the endless belt which are extended around the two pulley assemblies are not equal, for example in the direction to further increase the difference of the transmission ratio from unity, then it will be understood that (in order to maintain the endless belt properly taut) the amount of tautening movement towards one another required between the movable and the fixed pulley members of that pulley assembly which at this time is providing the greater pulley radius, is less than the corresponding amount of loosening movement away from one another required between the movable and the fixed pulley members of that pulley assembly which is providing the lesser pulley radius. This is because the run of the endless belt around that pulley assembly which is providing the greater pulley radius extends through a greater angle around its center than does the run of the endless belt around that pulley assembly which is providing the lesser pulley radius, and is an inevitable consequence of the construction, assuming that the distance between the shafts of the two pulley assemblies is kept constant, that the length of the endless belt is fixed, and that the width of the V-shaped groove of each of the pulley assemblies is altered by the movement of only one of its pulley members on its one side.

Therefore, since during alteration of transmission ratio the centers of the V-shaped grooves move through different corresponding distances, it is inevitable that skewing of the endless belt will occur at some times; but however is highly undesirable for the reason that load transmission during skewing causes severe strains to be put on the endless belt. In particular, in the case of an endless belt assembly structured as suggested above, when power is being transmitted with the endless belt assembly skewed, i.e. with the centers of the V-shaped grooves of the pulley assemblies being offset from one another in the direction of the axes of the shafts, then the backing belt or belts of the endless belt assembly, which typically is flexible in one direction but very stiff in a transverse direction, may be severely strained. Further, the sides of the wedge shaped blocks of the endless belt assembly are caused to scrape against the sides of the pulley members in a misaligned fashion. Particularly, if as is conventional the wedge shaped blocks are formed with slots cut into their sides between which slots there remain neck portions, and if two of the backing belts are provided, one fitted into the ones of these slots in each of the longitudinal directions of the shafts, then operation of the endless belt assembly under load in a skewed position may result in one of the backing belts being twisted and skewed so much as to come into contact with either the neck portions of one or more of the blocks, or with the conical face of one of the pulley members of one of the pulley assemblies. In either case, severe damage to the transmission can result. And, since both the maximum speed of power transmission through the continuously variable belt transmission device, and the maximum attainable torque, are also critically dependent upon non skewing of the belt assembly thereof, the conventional construction is also limited in respect to these respects.

SUMMARY OF THE INVENTION

In more detail, when as is conventional in the standard unity transmission ratio position the centers of the V-shaped grooves are coincident in the axial direction of the shafts, then the amount of skewing may be calculated by the following equation:

$$M = \frac{D^2}{\pi L} \left( \frac{E-1}{E+1} \right)^2 \cdot \tan \alpha$$

where:
M is the amount of skewing of the belt assembly;
D is the diameter of the curved runs of the belt assembly in the standard unity transmission ratio position;
L is the perpendicular distance between the driving and driven shafts;
E is the current transmission ratio; and
$\alpha$ is the half-angle of the V-shaped grooves of the pulley assemblies.

To take a numerical example, in the case of a continuously variable belt transmission device for which D is 110 mm, L is 155 mm, and $\alpha$ is 12°, then when the transmission ratio E is either 2.3 or 1/2.3 the value of the misalignment or skewing M is 0.82 mm. This skewing occurs in the same direction, whether speed is being increased with the transmission ratio being greater than 1 (i.e., 2.3) or speed is being reduced with the transmission ratio being less than 1 (i.e., 1/2.3).

In view of these calculations, it is the primary object of the present invention to provide a continuously variable belt transmission device, the construction of which is so improved that minimum skewing of the endless belt assembly thereof can occur.

It is a further object of the present invention to provide such a continuously variable belt transmission device, which has little skewing of the endless belt assembly thereof, even when the transmission is set to the most extreme conditions of transmission ratio, in either direction.

It is a further object of the present invention to provide such a continuously variable belt transmission device, which minimizes the maximum amount of skewing of the endless belt assembly thereof.

It is a further object of the present invention to provide such a continuously variable belt transmission device, which reduces the likelihood of damage to the endless belt assembly caused by power transmission while in the skewed state.

It is a yet further object of the present invention to provide such a continuously variable belt transmission device, the belt assembly of which is of the general construction outlined above, and in which the likelihood of one of the backing belts coming into contact with the neck portions of the transmission blocks is reduced.

It is a yet further object of the present invention to provide such a continuously variable belt transmission device, the belt assembly of which is of the general construction outlined above, and in which the likelihood of one of the backing belts coming into contact with the conical contact surfaces of the pulley members is reduced.

It is a yet further object of the present invention to provide such a continuously variable belt transmission device, of which the durability is good.

It is a yet further object of the present invention to provide such a continuously variable belt transmission device, which enables the maximum speed of the power transmission therethrough to be maximized.

It is a yet further object of the present invention to provide such a continuously variable belt transmission device, which enables the maximum torque of the power transmission therethrough to be maximized.

According to the most general aspect of the present invention, these and other objects are accomplished by a continuously variable belt transmission device, comprising: (a) a driving pulley assembly rotatable about a first axis, comprising: (a1) an axially fixed driving pulley member, which is rotatable around said first axis but is fixed with respect to axial movement along said first axis, and which has a conical face; and (a2) an axially movable driving pulley member, which is rotatable around said first axis and is selectively axially movable along said first axis, and which is formed with a conical face on its side facing said axially fixed driving pulley member, whose conical face also faces towards said axially movable driving pulley member; (a3) a V-shaped driving pulley groove being defined between said conical faces of said axially movable and said axially fixed driving pulley members, the width of said V-shaped driving pulley groove being selectively variable according to axial movement of said axially movable driving pulley member; (b) a driven pulley assembly rotatable about a second axis parallel to and transversely displaced from said first axis, comprising: (b1) an axially fixed driven pulley member, which is rotatable around said second axis but is fixed with respect to axial movement along said second axis, and which has a conical face; and (b2) an axially movable driven pulley member, which is rotatable around said second axis and is selectively axially movable along said second axis, and which is formed with a conical face on its side facing said axially fixed driven pulley member, whose conical face also faces towards said axially movable driven pulley member; (b3) a V-shaped driven pulley groove being defined between said conical faces of said axially movable and said axially fixed driven pulley members, the width of said V-shaped driven pulley groove being selectively variable according to axial movement of said axially movable driven pulley member, said V-shaped driven pulley groove of said driven pulley assembly generally opposing said V-shaped driving pulley groove of said driving pulley assembly; (b4) the axial arrangement along said second axis of said axially movable and said axially fixed driven pulley members being opposite to the axial arrangement along said first axis of said axially movable and said axially fixed driving pulley members; and (c) an endless belt assembly, which is fitted in a power transmitting manner around said driving pulley assembly and said driven pulley assembly in the V-shaped grooves thereof; and (d) wherein, when the width of said V-shaped driving pulley groove of said driving pulley assembly is substantially equal to the width of said V-shaped driven pulley groove of said driven pulley assembly with said endless belt assembly being substantially taut between said driving pulley assembly and said driven pulley assembly, the axial center of said V-shaped driving pulley groove of said driving pulley assembly is, relative to the axial center of said V-shaped driven pulley groove of said driven pulley assembly, offset towards said axially movable driven pulley member along the direction of said first and second axes.

According to such a structure, by this offsetting, the maximum amount of skewing of the endless belt assembly, during the operation of the continuously variable transmission over the range of transmission ratios which it provides, is minimized, as will be explained later in detail with regard to the description of the preferred embodiment of the present invention. In other words, by a skewing being provided in the direction specified when the transmission is in its standard unity transmission ratio position, the initial part of the skewing caused by variation of the transmission ratio from unity (in either direction, either upwards or downwards) is cancelled out. This means that the likelihood of damage to the endless belt assembly caused by power transmission while in the skewed state is minimized. Further, if the endless belt assembly is structured as specified above, the likelihood of one of the backing belts coming into contact with the neck portions of the transmission blocks, or with the conical contact surfaces of the pulley members, is reduced. Thus, a continuously variable belt transmission device is provided according to the present invention, of which the durability is good. Accordingly, the maximum rotational speed of, and/or the maximum torque transmitted by, the continuously variable belt transmission device, can be advantageously increased.

Further, according to a particular specialization of the present invention, the amount of said offset of said axial center of said V-shaped driving pulley groove of said driving pulley assembly relative to the axial center of said V-shaped driven pulley groove of said driven pulley assembly, when the transmission is in its standard unity transmission ratio position, is substantially as determined by the expression.

$$\frac{D^2}{2\pi L}\left(\frac{E_{max} - 1}{E_{max} + 1}\right)^2 \cdot \tan \alpha$$

where D is the diameter of the curved runs of said endless belt assembly in said standard unity transmission ratio position, L is the perpendicular distance between said first and said second axes, $E_{max}$ is the maximum value of transmission ratio to which the continuously variable belt transmission device can be set, and $\alpha$ is the common half-angle of said V-shaped grooves of said driving and driven pulley assemblies. As will be explained later, this value of offset ensures that the maximum value of the skewing of the endless belt assembly is about half of what it was in the prior art.

BRIEF DESCRIPTION OF THE DRAWING

The present invention will now be shown and described with reference to the preferred embodiment thereof, and with reference to the illustrative drawing. It should be clearly understood, however, that the description of the embodiment, and the drawing, are all of them given purely for the purposes of explanation and exemplification only, and are none of them intended to be limitative of the scope of the present invention in any way, since the scope of the present invention is to be defined solely by the legitimate and proper scope of the appended claims. In the drawing, the sole FIGURE thereof is a sectional view of the preferred embodiment of the continuously variable belt transmission device of the present invention, taken in a plane which includes the parallel central axes of power input and output shafts thereof.

DESCRIPTION OF THE PREFERRED EMBODIMENT

In the drawing, the reference numeral 1 generally denotes a driving pulley assembly, and the reference numeral 11 generally denotes a driven pulley assembly. These two pulley assemblies are mounted on parallel axes and are generally opposite to one another, these parallel axes remaining fixed, and thus the distance between the pulley assemblies 1 and 11 remaining fixed during operation.

The driving pulley assembly 1 comprises two conical pulley members: an axially fixed driving pulley member 2 and an axially movable driving pulley member 3, which are axially opposed with their respective conical faces 2a and 3a, which are formed with substantially equal cone angles $90° - \alpha$, facing one another along the axial line of said driving pulley assembly 1. The axially fixed driving pulley member 2, which lies to the left in the drawing, is integrally formed together with and is accordingly rotationally fixed with respect to a driving shaft 4, which extends along said axial line of said driving pulley assembly 1 and projects to the right in the drawing, while on the other hand the axially movable driving pulley member 3, which lies to the right in the drawing, is engaged in an axially slidable fashion over said driving shaft 4. Thus, as said axially movable driving pulley member 3 is moved axially to the left or to the right in the drawing, respectively, the V-shaped groove 5 which is defined between its conical face 3a and the opposing conical face 2a of the axially fixed driving pulley member 2 is continuously either narrowed or widened, its angle of course remaining constant, while its center point is shifted along the axis of the driving shaft 4 by an amount equal to a half of the displacement of the axially movable driving pulley member 3.

The right side in the drawing of the axially movable driving pulley member 3 is formed in a hollow shape, and the opening of this hollow shape is closed by a back plate 6 which is fitted over the driving shaft 4, so as to define a pressure chamber 7 within the movable pulley member 3. According to the selective supply of actuating fluid pressure (such as oil pressure or hydraulic fluid pressure) to this pressure chamber 7, the movable pulley member 3 may be moved leftwards or rightwards as mentioned above, so as to alter the width of the V-shaped groove 5.

Likewise, the driven pulley assembly 11 comprises two conical pulley members: an axially fixed driven pulley member 12 and an axially movable driven pulley member 13. These pulley members 12 and 13 are axially opposed, with their respective conical faces 12a and 13a, which are formed with substantially equal cone angles $90° - \alpha$ which are also substantially equal to the cone angles of the conical faces 2a and 3a of the axially fixed driving pulley member 2 and the axially movable driving pulley member 3 of the driving pulley assembly 1, facing one another along the axial line of said driven pulley assembly 11. The axially fixed driven pulley member 12, which lies to the right in the drawing, is integrally formed together with and is accordingly rotationally fixed with respect to a driven shaft 14, which extends along said axial line of said driven pulley assembly 11 and projects to the left in the drawing, while on the other hand the axially movable driven pulley member 13, which lies to the left in the drawing, is engaged in an axially slidable fashion over said driven shaft 14. Thus, as said axially movable driven pulley member 13 is moved axially to the right or to the left in the drawing, respectively, the V-shaped groove 15 which is defined between its conical face 13a and the opposing conical face 12a of the axially fixed driven pulley member 12 is continuously either narrowed or widened, its angle $2\alpha$ of course remaining constant, while its center point is shifted along the axis of the driven shaft 14 by an amount equal to a half of the displacement of the axially movable driven pulley member 13.

The left side in the drawing of the axially movable driven pulley member 13 is formed in a hollow shape, and the opening of this hollow shape is closed by a back plate 16 which is fitted over the driven shaft 14, so as to define a pressure chamber 17 within the movable pulley member 13. According to the selective supply of actuating fluid pressure (such as oil pressure or hydraulic fluid pressure) to this pressure chamber 17, the movable pulley member 13 may be moved rightwards or leftwards as mentioned above, so as to alter the width of the V-shaped groove 15.

Thus, since the axially movable driving pulley member 3 of the driving pulley assembly 1 is on the right in the FIGURE of the axially fixed driving pulley member 2 of said driving pulley assembly 1, while on the other hand the axially movable driven pulley member 13 of the driven pulley assembly 11 is on the left in the FIGURE of the axially fixed driven pulley member 12 of said driven pulley assembly 11, the axial order of the movable and fixed pulley members on the parallel driving and driven shafts 4 and 14 is opposite.

Around the driving pulley assembly 1 and the driven pulley assembly 11, fitting into the respective V-shaped grooves 5 and 15 thereof, there is provided an endless belt assembly 20. This endless belt assembly 20 comprises a plurality of substantially identical transmission blocks 22, only two of which can be seen in the FIGURE because the others lie out of its sectional plane, and which are made of a material which has an appropriate coefficient of friction with respect to the material of the pulley members. Each of the blocks 22 is formed with a main portion 29 and a head portion 30, with a neck portion 31 joining these two portions together. Each of the main portions 29 is formed in a generally wedge shape, with two of its side surfaces 24 sloping towards one another to define an angle $2\alpha$ between one another, so that the transmission block 22 can fit snugly into the V-shaped groove 5 or 15 with its side surfaces 24 respectively contacting the conical surfaces 2a and 3a or 12a and 13a. A groove 23 is defined on each side of each of the blocks 22 between its main portion 29 and its head portion 30, while each of the head portions 30 is formed in a pointed shape. The endless belt assembly 20 further comprises two substantially identical endless bands 21, 21 made of thin metallic plate which are looped around the driving pulley assembly 1 and the driven pulley assembly 11 in an axially spaced apart manner. The transmission blocks 22 are fixed along the bands 21, 21, somewhat spaced apart, with the left hand one in the drawing of the bands 21 fitted into the grooves 23 on the left hand sides of the blocks 22, while the right hand one of the bands 21 is fitted into the grooves 23 on the right hand sides of the blocks 22.

Thus, suppose the distance between the axially fixed driving pulley member 2 and the axially movable driving pulley member 3, and the distance between the axially fixed driven pulley member 12 and the axially movable driven pulley member 13, are so adjusted that the endless belt assembly 20 is stretched taut between the pulley assemblies 1 and 11, which can be done in any one of a continuous range of settings. Then, when the driving shaft 4 is rotated, power is transmitted by the endless belt assembly 20 to the driven shaft 14, at a gearing ratio which is determined by the ratio between the radiuses of the two runs of the endless belt assembly 20 which are stretched around the pulley assemblies 1 and 11, due to the gripping of the side surfaces 24 of the transmission blocks 22 against the conical surfaces 2a and 3a and 12a and 13a. And, by moving the axially movable driving pulley member 3 towards or away from the axially fixed driving pulley member 2 along the driving shaft 4, while simultaneously moving the axially movable driven pulley member 13 towards or away from the axially fixed driven pulley member 12 along the driven shaft 14, which can be done by an appropriate supply of fluid to the pressure chambers 7 and 17, while always keeping the endless belt assembly 20 appropriately taut, the rotary power transmission ratio can be continuously varied without interrupting power transmission.

A transmission system of this general basic type, so far as it has been described hereinabove, is known, and has been disclosed for example in Japanese Patent Laying Open Publication Ser. No. 55-6783 (1980). The special feature of the shown preferred embodiment of the present invention, which advantageously distinguishes it from such prior art, will now be explained. When the axially movable driving pulley member 3 and the axially movable driven pulley member 13 are so positioned on the respective shafts 4 and 14 that the widths of the respective V-shaped grooves 5 and 15 at equal radiuses are equal, i.e. so that the distance between the points (actually circular end rings) of the fixed and movable driving pulley members 2 and 3 is equal to the distance between the points of the fixed and movable driven pulley members 12 and 13, of course with the belt assembly 20 taut, as shown in the drawing, then the transmission ratio R is unity. This state of the mechanism will hereinafter be termed the transmission ratio unity position. In this state, according to the present invention, the respective positions Ci and Co in the axial direction of the shafts 4 and 14 of the center of the V-shaped groove 5 and of the center of the V-shaped groove 15 do not coincide; rather, they are separated by a certain non zero spacing, denoted by S(R=1) in the FIGURE. And, further, the centers of the respective grooves 5 and 15 are, in this axial direction, displaced towards the respective axially fixed pulley members; in other words, in the drawing which illustrates this unity transmission ratio position, the position Ci with respect to the horizontal direction in the FIGURE of the center of the V-shaped groove 5 of the driving pulley assembly 1 lies to the left of the position Co of the center of the V-shaped groove 15 of the driven pulley assembly 11.

The reason for this is that, as explained above with reference to the prior art, inevitably some skewing must occur as the transmission ratio is altered, and it is the concept of the present invention to reduce this skewing as much as possible. In more detail, according to a particular specialization of the present invention, this offset between the driving and driven pulley assemblies 1 and 11, in the unity transmission ratio position, is approximately as calculated by the following formula:

$$K = \frac{D^2}{2\pi L} \left( \frac{Emax - 1}{Emax + 1} \right)^2 \cdot \tan \alpha$$

where:

K is the amount of said offset between the driving and driven pulley assemblies in the unity transmission ratio position;

D is the diameter of the curved runs of the belt assembly in the standard unity transmission ratio position;

L is the perpendicular distance between the driving and driven shafts;

Emax is the maximum value of transmission ratio (the minimum value of transmission ratio may be the reciprocal of this); and α is the half-angle of the V-shaped grooves of the pulley assemblies.

In other words, this unity offset is set to be one half of the misalignment or skewing value as determined by the formula given earlier, when the transmission ratio is at its maximum. For instance, in the case of the previous exemplary continuously variable belt transmission device described for which D is 110 mm, L is 155 mm, and α is 12°, then, if the maximum and minimum transmission ratios Emax and 1/Emax are 2.3 and 1/2.3, the value of the offset between the driving and driven pulley assemblies in the unity transmission ratio position, according to the present invention, is set to 0.41 mm. This means that the maximum amount of skewing of the transmission belt during operation can only be 0.41 mm, and usually in fact the skewing is substantially less. Thus, according to the present invention, the maximum skewing of the endless belt assembly is halved.

In other words, even when as for example shown by double dotted lines in the drawing the continuously variable belt transmission device of the present invention is set so as to provide a speed increasing ratio, with the axially movable driving pulley member 3 of the driving pulley assembly 1 approached by a relatively smaller amount leftwards in the FIGURE towards its axially fixed driving pulley member 2 from its position in the standard unity transmission ratio position as illustrated by the solid lines, and with the axially movable driven pulley member 13 of the driven pulley assembly 11 approached by a relatively larger amount also leftwards in the FIGURE towards its axially fixed driven pulley member 12 from its position in the standard unity transmission ratio position, the total actual offset between the centers of the V-shaped grooves of the driving and driven pulley assemblies 1 and 11 is relatively small as compared with the prior art, because either all or a large first part of the change of offset between these centers caused by the altering of the transmission ratio away from unity goes towards cancelling the basic initial offset K set as defined above. The case when the set transmission ratio is less than unity is similar, but opposite, as will be easily understood based upon the foregoing descriptions. Thus, according to the present invention, there is provided a continuously variable belt transmission device, the construction of which is so improved that minimum skewing of the endless belt assembly thereof can occur. Indeed, in this continuously variable belt transmission device, there is little skewing of the endless belt assembly thereof, even when the transmission is set to the most extreme conditions of transmission ratio, in either direction; and, to be precise, the maximum amount of skewing of the endless belt assembly thereof is minimized, being about half what it was in the prior art. Thereby, the likelihood of damage to the endless belt assembly caused by power transmission while in the skewed state is minimized. Further, the likelihood of one of the backing belts coming into contact with the neck portions of the transmission blocks, or with the conical contact surfaces of the pulley members, is reduced. Thus, a continuously variable belt transmission device is provided according to the present invention, of which the durability is good. Accordingly, the maximum rotational speed of, and/or the maximum torque transmitted by, the continuously variable belt transmission device, can be advantageously increased.

Although the present invention has been shown and described with reference to the preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawing, but solely by the scope of the appended claims, which follow.

What is claimed as new and desired to be secured by Letters Patent of the United States is:

1. A continuously variable belt transmission device, comprising:
   (a) a driving pulley assembly rotatable about a first axis, comprising:
      (a1) an axially fixed driving pulley member, which is rotatable around said first axis but which is fixed with respect to axial movement along said first axis, and which has a conical face; and
      (a2) an axially movable driving pulley member, which is rotatable around said first axis and is selectively axially movable along said first axis, and which is formed with a conical face on its side facing said axially fixed driving pulley member, whose conical face also faces toward said axially movable driving pulley member;
      (a3) a V-shaped driving pulley groove being defined between said conical faces of said axially movable and said axially fixed driving pulley members, the width of said V-shaped driving pulley groove being selectively variable according to axial movement of said axially movable driving pulley member;
   (b) a driven pulley assembly rotatable about a second axis parallel to and transversely displaced from said first axis, comprising:
      (b1) an axially fixed driven pulley member, which is rotatable around said second axis but which is fixed with respect to axial movement along said second axis, and which has a conical face; and
      (b2) an axially movable driven pulley member, which is rotatable around said second axis and which is selectively axially movable along said second axis, and which is formed with a conical face on its side facing said axially fixed driven pulley member, whose conical face also faces towards said axially movable driven pulley member;
      (b3) a V-shaped driven pulley groove being defined between said conical faces of said axially movable and said axially fixed driven pulley members, the width of said V-shaped driven pulley groove being selectively variable according to axial movement of said axially movable driven pulley member, said V-shaped driving pulley groove of said driving pulley assembly generally opposing said V-shaped driving pulley groove of said driving pulley assembly;
      (b4) the axial arrangement along said second axis of said axially movable and said axially fixed driven pulley members being opposite the axial arrangment along said first axis of said axially movable and said axially fixed driving pulley members; and
   (c) an endless belt assembly, which is fitted in a power transmitting manner around said driving pulley assembly and said driven pulley assembly in the V-shaped grooves thereof;
   (d) wherein, when in a state that the width of said V-shaped driving pulley groove of said driving pulley assembly is substantially equal to the width of said V-shaped driven pulley groove of said driven pulley assembly with said endless belt assembly being substantially taut between said driving pulley assembly and said driven pulley assembly, the axial center of said V-shaped driving pulley groove of said driving pulley assembly is, relative to the axial center of said V-shaped driven pulley groove of said driven pulley assembly, offset towards said axially movable driven pulley member along the direction of said first and second axes substantially by an amount of $$\frac{D^2}{2\pi L} \left( \frac{E_{max} - 1}{E_{max} + 1} \right)^2 \cdot \tan \alpha$$

where D is the diameter of curved runs of said endless belt assembly in said state, L is the perpendicular distance between said first and said second axes, Emax is a maximum value of transmission ratio to which the continuously variable belt transmission device can be set, and $\alpha$ is a common half-angle of said V-shaped grooves of said driving and driven pulley assemblies.

2. A continuously variable belt transmission device according to claim 1, wherein said endless belt assembly comprises a plurality of transmission blocks arranged along a backing belt.

3. A continuously variable belt transmission device according to claim 1, wherein said endless belt assembly comprises a plurality of transmission blocks each comprising a main portion formed in a wedge shape, a head portion, and a neck portion linking said main portion and said head portion with two grooves being defined on opposite sides in the direction of said first and second axes of said neck portion, said endless belt assembly further comprising two backing belts, each being fitted into the ones of said grooves in a particular axial direction of said transmission blocks.

* * * * *